(12) United States Patent
Kim et al.

(10) Patent No.: US 10,328,413 B2
(45) Date of Patent: Jun. 25, 2019

(54) ADSORBENT FOR CARBON DIOXIDE AND MANUFACTURING METHOD FOR THE SAME

(71) Applicant: KOREA ADVANCED INSTITUTE OF SCIENCE AND TECHNOLOGY, Daejeon (KR)

(72) Inventors: Sang Ouk Kim, Daejeon (KR); Young Tak Oh, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 677 days.

(21) Appl. No.: 14/864,210

(22) Filed: Sep. 24, 2015

(65) Prior Publication Data

US 2016/0144339 A1    May 26, 2016

(30) Foreign Application Priority Data

Nov. 25, 2014 (KR) .................. 10-2014-0165457
Feb. 3, 2015 (KR) .................. 10-2015-0016709

(51) Int. Cl.
*B01J 20/22* (2006.01)
*B01J 20/02* (2006.01)
*B01J 20/30* (2006.01)

(52) U.S. Cl.
CPC ........... *B01J 20/22* (2013.01); *B01J 20/0259* (2013.01); *B01J 20/3078* (2013.01)

(58) Field of Classification Search
CPC .... B01J 20/22; B01J 20/0259; B01J 20/3078; B01J 20/02; B01J 20/30; C01B 32/198; C01B 32/20; C01B 32/305; C01B 32/182; C01B 32/18; C01B 32/158; C01B 32/00; C01B 32/15
See application file for complete search history.

(56) References Cited

PUBLICATIONS

Oh et al (NPL: "Selective and Regenerative Carbon Dioxide Capture by Highly Polarizing Porous Carbon Nitride", ACSNANO, vol. 9 , No. 9, pp. 9148-9157, Aug. 2015).*
Of Lee et al (NPL: "Graphene oxi-assisted production of carbon nitrides using a solution process and their photocatalytic activity", Carbon 66 pp. 119-125, 2014).*

* cited by examiner

*Primary Examiner* — Melvin C. Mayes
*Assistant Examiner* — Smita S Patel

(57) ABSTRACT

Provided is an adsorbent for carbon dioxide, including: a graphene oxide layer having an interconnected network structure; and carbon nitride formed on the graphene oxide layer.

11 Claims, 5 Drawing Sheets

ADSORBENT FOR CARBON DIOXIDE AND MANUFACTURING METHOD FOR THE SAME

CROSS-REFERENCE TO RELATED APPLICATION

This application claims priority of Korean Patent Application No. 10-2014-0165457, filed on Nov. 25, 2014 and priority of Korean Patent Application No. 10-2015-0016709, filed on Feb. 3, 2015, in the KIPO (Korean Intellectual Property Office), the disclosure of which is incorporated herein entirely by reference.

BACKGROUND OF THE INVENTION

Field of the Invention

The following disclosure relates to an adsorbent for carbon dioxide and a method for preparing the same. More particularly, the following disclosure relates to an adsorbent for carbon dioxide that has excellent adsorption/desorption characteristics even at room temperature under ambient pressure and shows significantly high selectivity to nitrogen gas, as well as to a method for preparing the same.

Description of the Related Art

In the case of industrial exhaust gas, separation (isolation) of $CO_2$ (carbon dioxide) is regarded as one of the most important technologies for realizing the green and sustainable future. It is required that the properties of a material for separation of carbon dioxide are evaluated under two extreme working conditions, i.e., adsorption and desorption conditions.

Due to the necessity for a nanomaterial having high $CO_2$ storage capacity, desorption phenomena are often ignored. In this context, a fundamental problem occurs because of interdependence between $CO_2$ affinity and selectivity. According to the present disclosure, the principle of gelling is used to provide the surface of porous graphene with two-dimensional graphitic $C_3N_4$ (g-$C_3N_4$). By virtue of the presence of micropores formed from non-coplanar edges, it is possible to provide an optimal region between chemical adsorption and physical adsorption. The material according to the present disclosure shows improved carbon dioxide adsorptivity (0.43 mmol·g$^{-1}$) and high selectivity to nitrogen ($\alpha_{12}^{ads}$=113) at room temperature, and still has desorption capability (R=98%) to the captured carbon dioxide.

Basically, in the calculation based on a density function, the principle of interaction between carbon dioxide and g-$C_3N_4$ is classified into interaction between dipole and induced dipole. According to the present disclosure, there is provided an adsorbent for $CO_2$ that allows easy adsorption and desorption of carbon dioxide from materials abundant in the earth.

Post-combustion gas from power plants, i.e. exhaust gas occupies 40% or more of the total emission of $CO_2$. Effective control of exhaust gas is significantly important in view of provision for global warming and sustainable supply of energy. Currently, control of industrial exhaust gas is largely based on wet chemical adsorption using an alkanolamine solvent.

Unfortunately, separation of $CO_2$ and that of such a solvent require a significantly large amount of energy (up to 30% of the total energy production). In addition, there is a problem of an increase in cost due to a corrosive operating condition. Although there has been a study about a metal organic framework partially containing zeolite as a substitute material, there are problems in that an expensive transition metal catalyst is used and regeneratability is low due to high adsorption energy.

Strong adsorption energy is an important factor for a high degree of capture for carbon dioxide. However, it inevitably results in desorption of carbon dioxide and an increase in regeneration energy. An ideal adsorbent for carbon dioxide should have high regeneratability in an easy carbon dioxide adsorption/desorption mechanism and adequate adsorption energy.

SUMMARY OF THE INVENTION

An embodiment of the present disclosure is directed to providing an adsorbent for carbon dioxide which shows excellent selectivity and stability and improved regeneratability, while providing increased carbon dioxide adsorption capacity even in the absence of a metal. Another embodiment of the present disclosure is directed to providing a method for preparing the adsorbent for carbon dioxide.

In an aspect, there is provided an adsorbent for carbon dioxide, including: a graphene oxide layer having an interconnected network structure; and carbon nitride formed on the graphene oxide layer.

According to an embodiment, the graphene oxide layer has an interconnected network structure formed by gelling a solution in which graphene oxide is dispersed.

According to another embodiment, the carbon nitride has a graphitic structure.

According to still another embodiment, the adsorbent for carbon dioxide is formed by mixing the solution in which graphene oxide is dispersed with a nitrogen-containing carbon material, followed by gelling and heat treatment.

According to still another embodiment, the carbon nitride is a two-dimensional layered material including hexagonal heptazine(tris-s-triazine) units.

According to still another embodiment, the carbon nitride has a condensed polymer structure.

According to still another embodiment, the carbon nitride is bound to the graphene oxide layer in the form of monomers forming the polymer structure, and then condensed to form the polymer structure.

In another aspect, there is provided a method for preparing an adsorbent for carbon dioxide, including the steps of: mixing a dispersion of graphene oxide with a dispersion of monomers containing nitrogen and carbon; gelling the resultant mixture; and heat treating the resultant gel to form carbon nitride derived from the monomers and provided on the network structure of the graphene oxide.

According to an embodiment, the monomers are polymerized during the heat treatment step.

According to another embodiment, the carbon nitride is a two-dimensional layered material including heptazine(tris-s-triazine) units organized in the form of hexagons and connected via a tertiary amine.

In still another aspect, there is provided an adsorbent for carbon dioxide obtained by the above-mentioned method.

The adsorbent for carbon dioxide according to the present disclosure includes carbon nitride provided on the gel network having a graphitic structure and functionalized with nitrogen. Therefore, the adsorbent for carbon dioxide has excellent adsorption/desorption characteristics even at room temperature under ambient pressure and shows significantly high selectivity to nitrogen gas.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1A:
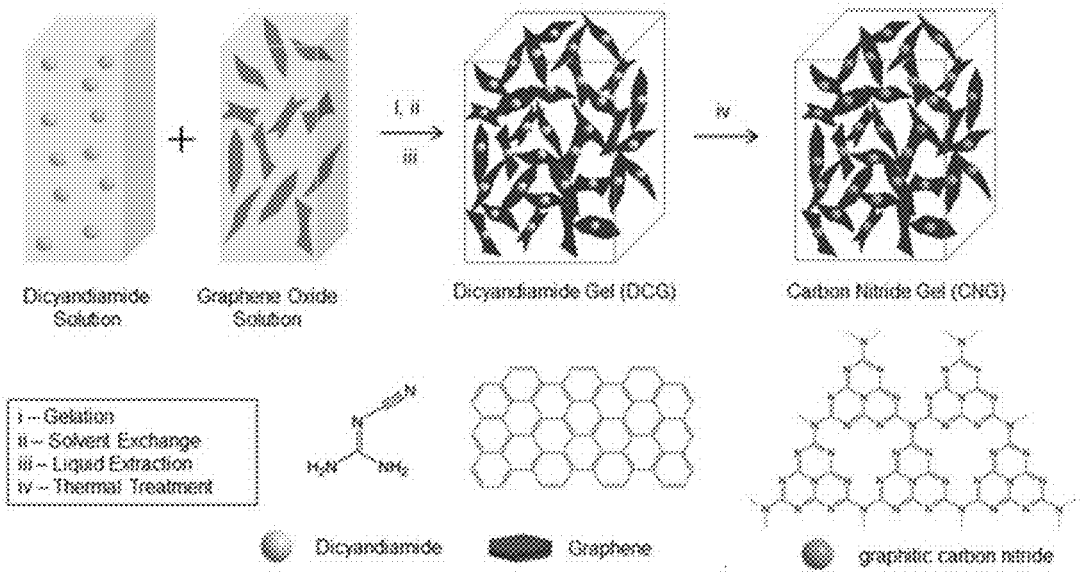
FIG. 1A is a view illustrating a highly porous network structure based on carbon nitride and a method for preparing the same.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

In order to solve the above mentioned problems, there is provided an adsorbent including carbon nitride and having excellent adsorption/desorption characteristics even at room temperature under ambient pressure. In addition, the adsorbent has significantly high selectivity to nitrogen gas. In one aspect, the adsorbent includes a graphene oxide layer having an interconnected network structure and carbon nitride formed on the graphene oxide layer. As a result, the adsorbent shows improved adsorption capacity and high selectivity to nitrogen through the use of carbon nitride, while maintaining the macroporosity of adsorbent.

According to an embodiment, the graphitic carbon nitride (g-$C_3N_4$) is a two-dimensional layered material including heptazine(tris-s-triazine) units organized by hexagons and connected via a tertiary amine. Such graphitic carbon nitride is generated from a tightly packed form of heptazine chains and has a non-planar structure with a well-defined porosity (d=7.5 Å). The material has genuine semiconductor characteristics (2.7 eV), chemical/thermal stability and pure microporosity of carbon nitride, and may be used for metal-free photocatalysts, biomolecule imaging, or the like.

Meanwhile, it is possible to prepare a compressed form of carbon nitride having the lowest surface area by using a currently available method. However, in this case, strong interlayer packing among heptazine chains and the general resistance against acid/base and solvent make it difficult to develop an intercalcation structure having a large surface area with high purity.

However, according to an embodiment of the present disclosure, carbon nitride is formed on the surface of the macroporous graphene gel network to provide improved adsorption capacity and high selectivity to nitrogen while maintaining excellent adsorption/regeneration characteristics.

Such a hetero-structure induces improvement of adsorption capacity and selectivity while eliminating high adsorption energy for constant specific volume. The dipole-induced dipole interaction of the carbon nitride-based adsorbent having a higher intensity (20-30 kJ·mol$^{-1}$) as compared to general physical adsorption (0.1-10 kJ·mol$^{-1}$) allows high carbon dioxide adsorption capacity (0.43 mmol·g$^{-1}$ 0.1 bar, 300K) and provides an excellent regeneratability (R=97.6%), high selectivity ($\alpha_{12}^{ads}$) and a broad adsorbent selection parameter (S=492).

EXAMPLES

Synthesis of Graphene Oxide

First, 1 g of graphite, 1 g of NaNO$_3$ and 47 mL of sulfuric acid are introduced to a round-bottom flask and agitated. Next, KMnO$_4$ is added gradually to the flask in an ice bath.

The resultant mixture is allowed to stand at 35° C. while agitating it continuously for 2 hours.

Then, 20 mL of aqueous hydrogen peroxide is added gradually to the flask under agitation while cooling the flask in an ice bath. After that, the resultant solution is filtered and washed with 4% hydrochloric acid five times. The purified solid material is dried at room temperature under vacuum for 24 hours. Then, 1 g of graphene oxide is mixed with 500 mL of deionized water, followed by ultrasonication for 2 hours. After the ultrasonication, the graphene oxide suspension is subjected to centrifugal separation under 1500-2000 rpm for 40 minutes to obtain foliated graphene oxide. Then, the solution of foliated graphene oxide is purified through a dialysis tube for 2 weeks.

Synthesis of Reduced Graphene Oxide Hydrogel and Aerogel Functionalized with Nitrogen First, 0.1 g of L-ascorbic acid and a variable amount of dicyanamide (40-400 mg) are added to 5 mL of the solution of foliated graphene oxide (2.4 mg·mL$^{-1}$) and heated to 50° C. for 30 minutes. The resultant black-colored solution is cooled at room temperature to induce gelling gradually within a time period of 8-10 hours. As a result, the viscous solution is converted into monolithic gel. The gel is washed with hot water twice and dipped into water for 5 days, and then into ethanol for 5 days. The solvent is exchanged each 8 hours to remove the remaining ion precursors or byproducts. The solvent-exchanged gel is dried with carbon dioxide under a supercritical condition. The resultant gel is converted into elastic monolithic aerogel.

Analysis

Post-synthetic foliation is a method useful for exposing pure graphene nitride sheets having a large surface area. However, there has not been disclosed to date a method effective for overcoming close interlayer stacking without chemical treatment. To solve the above-mentioned problem, a gel structure including a graphene network formed by reducing an aqueous dispersion of foliated graphene oxide under a mild condition is crosslinked with dicyandiamine, a soluble precursor for carbon nitride. Carbon nitride is grown by solvent exchange, liquid extraction and heat treatment. Such a method removes soluble impurities, and extracts the water molecules captured in the graphene layers to retain the porous network. In addition, the dicyandiamide precursor on the graphene surface is converted into a two-dimensional carbon nitride phase. The highly porous network structure based on carbon nitride is shown in FIG. 1A.

Figure 1B:
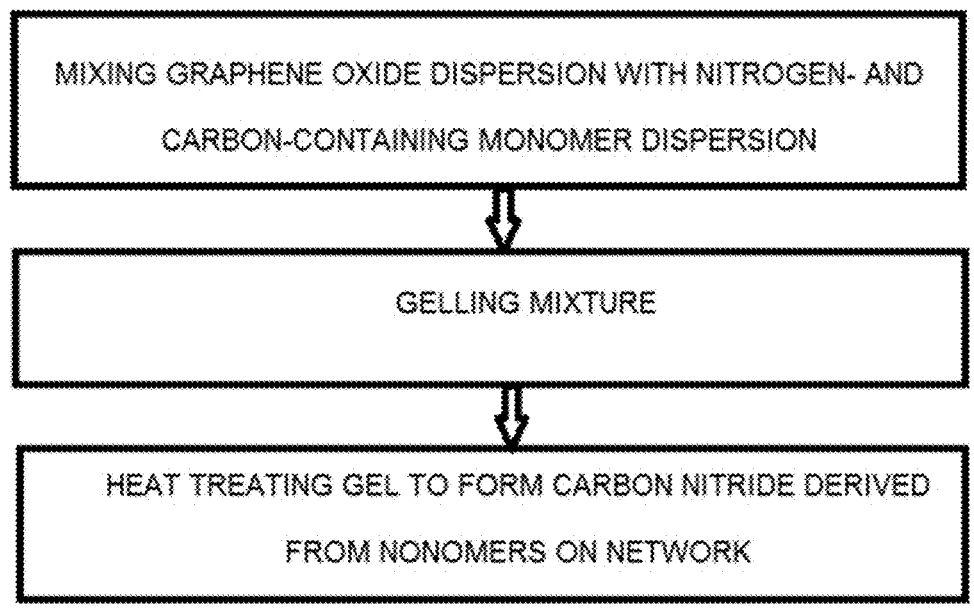
FIG. 1B is a flow chart illustrating the method for preparing an adsorbent according to an embodiment.

FIG. 1B is a flow chart illustrating the method for preparing an adsorbent according to an embodiment.

Referring to FIG. 1B, the method for preparing an adsorbent for carbon dioxide includes the steps of: mixing a dispersion of graphene oxide with a dispersion of monomers containing nitrogen and carbon; gelling the resultant mixture; and heat treating the resultant gel to form carbon nitride derived from the monomers and provided on the network structure of the graphene oxide.

Figure 1C:
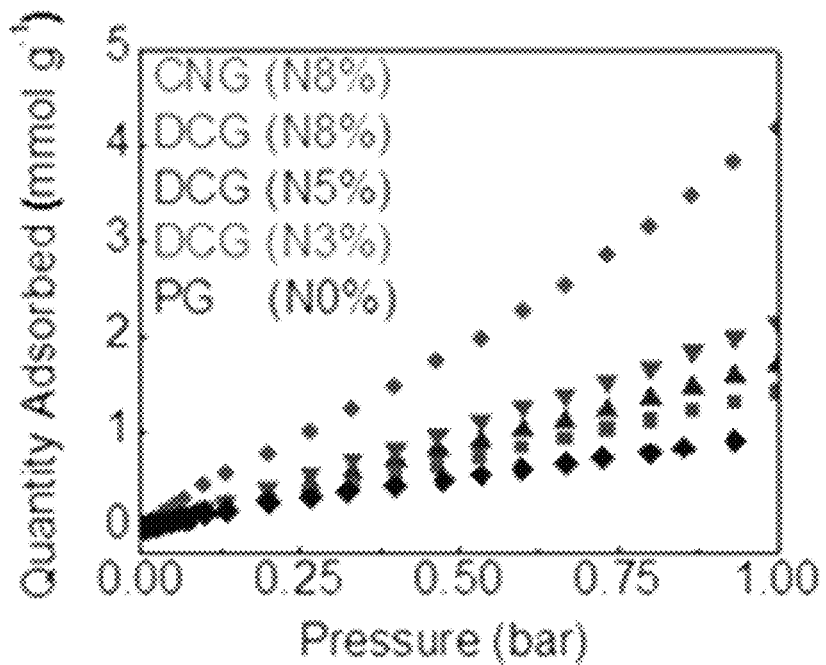
FIG. 1C is a graph illustrating the carbon dioxide capturing capacity of each of pure graphene gel (PG), dicyandiamide gel (DCG, containing 3-8 wt % of nitrogen) and carbon nitride-functionalized gel (CNG, containing 8 wt % of nitrogen).

FIG. 1C is a graph illustrating the carbon dioxide capturing capacity of each of pure graphene gel (PG), dicyandiamide gel (DCG, containing 3-8 wt % of nitrogen) and carbon nitride-functionalized gel (CNG, containing 8 wt % of nitrogen).

Referring to FIG. 1C, PG shows an adsorption capacity of 0.9 mmol·g$^{-1}$ at room temperature under ambient pressure. DCG shows an improved capacity, i.e. a capturing capacity of 1.4 mmol·g$^{-1}$, 1.7 mmol·g$^{-1}$ and 2.2 mmol·g$^{-1}$ in proportion to nitrogen content (3, 5 and 5%). This suggests that an amine-containing functional group has an important role in adsorption of carbon dioxide. However, due to an unstable solidification phenomenon of graphene gel at a dicyandiamide concentration of 40 mg·mL$^{-1}$, the nitrogen content in the gel network has a maximum limit (10 wt %) in nitrogen content. After the heat treatment, dicyandiamide is condensed into polymeric carbon nitride, which allows more improved carbon dioxide capturing capacity (4.2 mmol·g$^{-1}$).

To compare the carbon dioxide adsorption efficiency of the adsorbent for carbon dioxide including carbon nitride formed on the graphene gel network structure according to an embodiment of the present disclosure with that of another known material, five criteria are set and measured for various adsorbents.

The criteria include: carbon dioxide adsorption capacity ($N_1^{ads}$ [mmol·g$^{-1}$]), working capacity ($\Delta N_1 = N_1^{ads} - N_1^{des}$ [mmol·g$^{-1}$]), regeneratability ($R = (\Delta N_1/N_1^{ads}) \times 100[\%]$), adsorption selectivity (($\alpha_{12}^{ads} = (N_1^{ads}/N_2^{ads})(y_2/y_1)$), and adsorption selection parameter $S = (\alpha_{12}^{ads})^2/(\alpha_{12}^{des})(\Delta N_1/\Delta N_{12})$, under a pressure of 0.1 bar. The results are shown in the following Table 1.

TABLE 1

| CO$_2$ Adsorption at 300 K | $N_1^{ads}$ | $\Delta N_1$ | R | $\alpha_{12}^{ads}$ | S |
|---|---|---|---|---|---|
| Comp. Ex. 1 (ZIF-78[31]) | 0.60 | 0.58 | 96 | 35 | 396 |
| Comp. Ex. 2 (Zeolite-5A[4]) | 3.50 | 2.36 | 67 | 62 | 163 |
| Comp. Ex. 3 (Zeolite-13X[5]) | 2.49 | 1.35 | 54 | 86 | 128 |
| Comp. Ex. 4 (Ni-MOF-74[18]) | 4.34 | 3.20 | 74 | 41 | 84 |
| Comp. Ex. 5 (Co-carborane MOF-4b[32]) | 0.07 | 0.06 | 84 | 154 | 104 |
| Comp. Ex. 6 (Porous Graphene (PG)) | 0.14 | 0.13 | 93 | 39 | 175 |
| Example (CNG) | 0.43 | 0.42 | 98 | 113 | 427 |

$N_1^{ads}$ [mmol g$^{-1}$]: CO$_2$ uptake under adsorption conditions
$\Delta N_1 = N_1^{ads} - N_1^{des}$ [mmol g$^{-1}$]: Working CO$_2$ capacity
$R = (\Delta N_1/N_1^{ads}) * 100$ [%]: Regenerability
$\alpha_{12}^{ads} = (N_1^{ads}/N_2^{ads})(y_2/y_1)$: Selectivity under adsorption conditions
$S = (\alpha_{12}^{ads})^2/(\alpha_{12}^{des})(\Delta N_1/\Delta N_2)$: Sorbent selection parameter
1: strongly adsorbed component (CO$_2$)
2: weakly adsorbed component (N$_2$)
y: molar fraction in the gas phase Since carbon dioxide exists in the exhaust gas in a small amount (about 10-15%), the adsorption capacity under a pressure up to 0.1 bar is very important in calculating adsorption efficiency. The adsorbent (CNG) according to an embodiment of the present disclosure shows an adequate adsorption capacity for carbon dioxide (0.43) as compared to strongly bound adsorbents, such as Comparative Examples 2-4. The binding intensity on the surface of an adsorbent is directly applied to the adsorption capacity.

The adsorbent having a medium level of adsorption capacity according to an embodiment of the present disclosure is favorable to regeneration carried out by desorption of carbon dioxide. This is explained well by the working capacity ($\Delta N_1 = N_1^{ads} - N_1^{des}$ [mmol·g$^{-1}$]) in Table 1, i.e., discharge amount after adsorption, and the regeneratability, reusable carbon dioxide capturing point.

In general, an adsorbent having strong chemical adsorption force has a problem in that it has a working capacity decreased excessively based on the initial adsorption capacity, as can be seen from Comparative Examples 2-6 in Table 1. On the contrary, an adsorbent having an adequate level of adsorption force, such as Comparative Example 1, ZIF-82 (0.38 mmol·g$^{-1}$/0.41 mmol·g$^{-1}$) and the adsorbent according to an embodiment of the present disclosure (CNG, 0.42 mmol·g$^{-1}$/0.43 mmol·g$^{-1}$) show a slight drop in working capacity. This suggests that the most part of the surface still has activity even after the initial adsorption/desorption. Particularly, the adsorbent according to an embodiment of the present disclosure shows excellent regeneratability (97.6%).

Figure 1D:
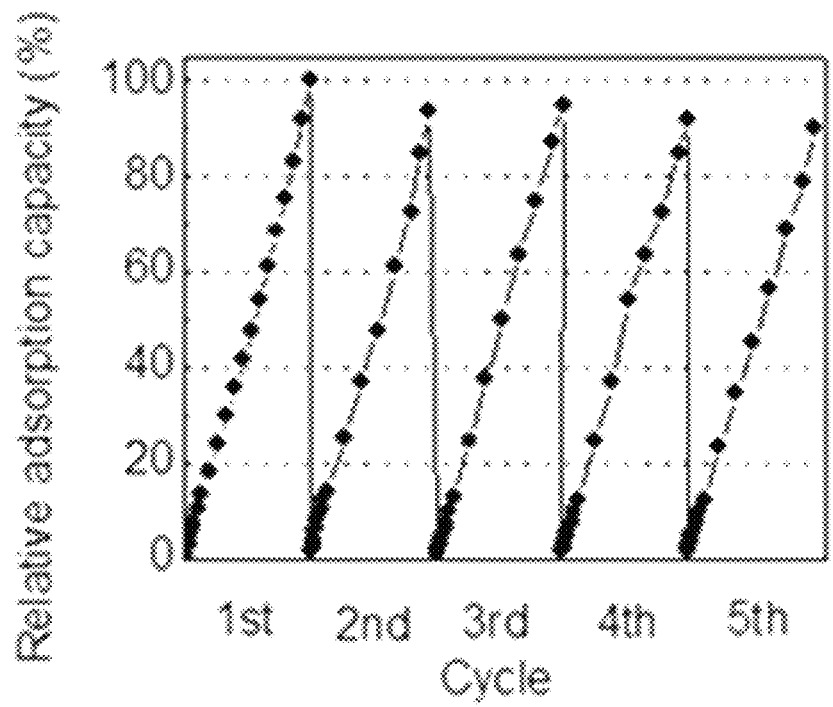
FIG. 1D is a graph illustrating the isothermal repetition cycles of carbon dioxide adsorption/desorption in a laboratory.

FIG. 1D is a graph illustrating the isothermal repetition cycles of carbon dioxide adsorption/desorption in a laboratory.

Referring to FIG. 1D, the graphene-based adsorbent according to an embodiment of the present disclosure has a regeneratability of 90-97% as a whole.

Figure 1E:
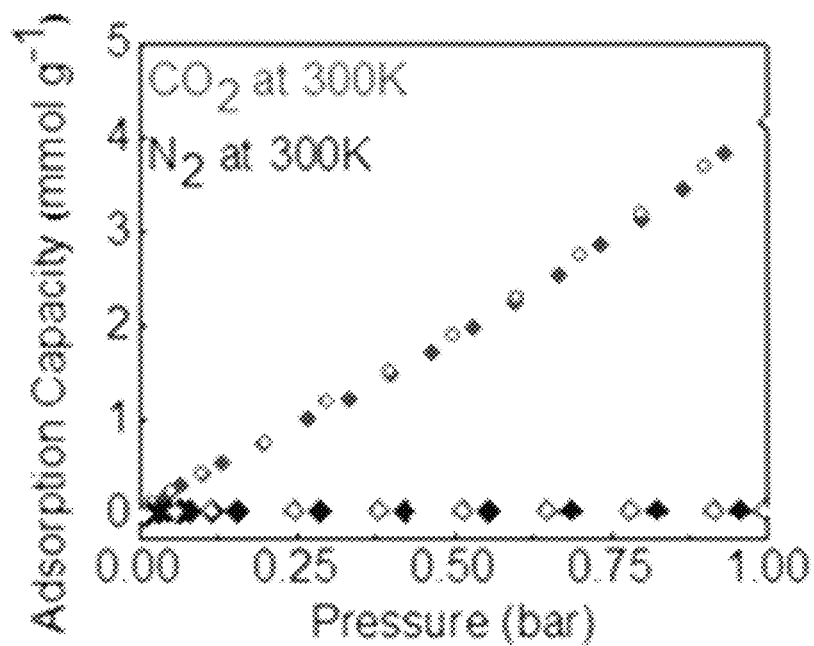
FIG. 1E is a graph illustrating the selectivity of the adsorbent disclosed herein to an excessive amount of nitrogen.

FIG. 1E is a graph illustrating the selectivity of the adsorbent disclosed herein to an excessive amount of nitrogen.

Referring to FIG. 1E, the experiment of isothermal adsorption/desorption for carbon dioxide and nitrogen at 300K shows a high selectivity of 113. In other words, the amount of adsorbed carbon dioxide increases as the pressure increases, while the amount of adsorbed nitrogen is maintained at a significantly low level. This suggests that the adsorbent according to an embodiment of the present disclosure has high selectivity.

Particularly, it is to be noted that the adsorbent having no metal, i.e., metal-free adsorbent according to an embodiment of the present disclosure shows selectivity equal to or higher than the selectivity of each of the other test samples. The finally measured parameter, i.e., adsorbent selection parameter (S) is a parameter illustrating both adsorption/desorption capacity and selectivity and shows the overall quality of an adsorbent under given conditions.

Referring to the results of Table 1, the adsorbent according to an embodiment of the present disclosure shows an S value of 427, which is higher than the parameters of Comparative Examples.

Figure 2A:
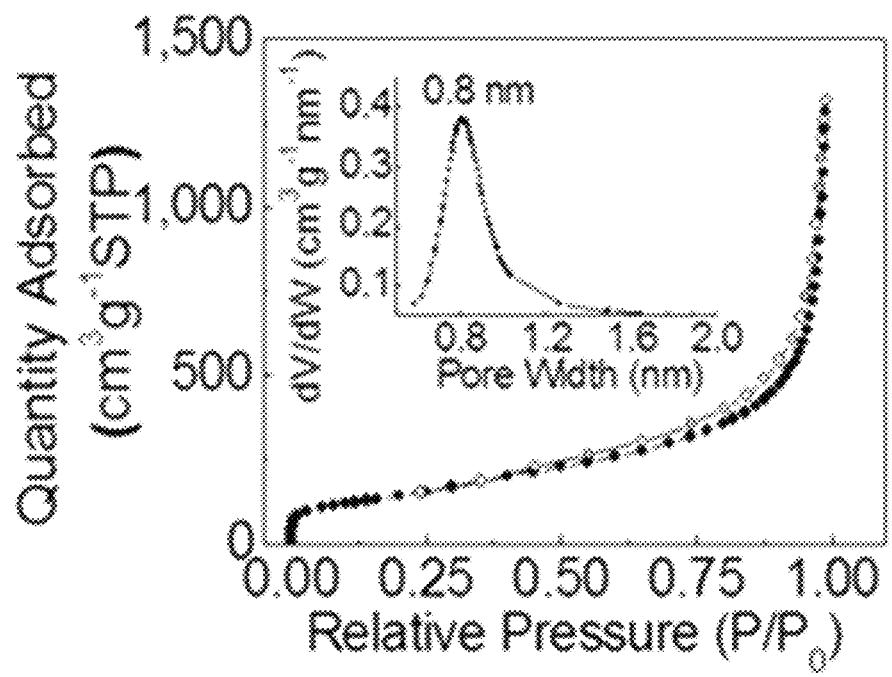
FIG. 2A shows an isothermal nitrogen adsorption curve based on an isothermal argon adsorption curve and a pore size distribution (inner side image).

One of the important criteria for an effective solid adsorbent is a stable porous structure, which is related with high surface area and excellent permeation/diffusion capability of an adsorbent. Herein, porosimetry based on an isothermal experiment for nitrogen and argon is used to determine such a porous structure. FIG. 2A shows an isothermal nitrogen adsorption curve based on an isothermal argon adsorption curve and a pore size distribution (inner side image).

Figure 2B:
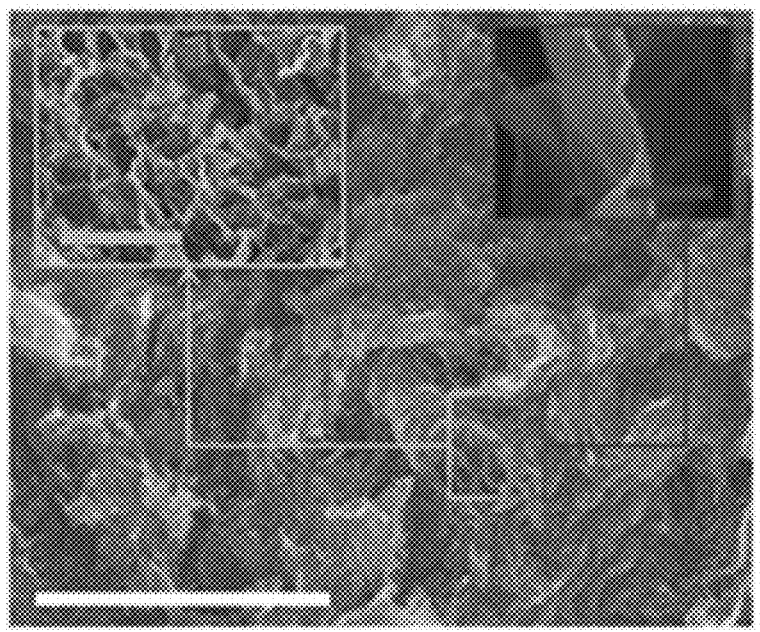
FIG. 2B is an image showing the organization structure of the adsorbent according to an embodiment taken by scanning electron microscopy (SEM).

Referring to FIG. 2A, it is demonstrated that the steps of gelling of graphene and drying are important in forming a desired porous structure. In addition, there are provided a large surface area (450 $m^2 \cdot g^{-1}$), large pore volume (1.5 $m^3 \cdot g^{-1}$) and a significant amount of mesopores (2<d<50 nm) and macropores (d>50 nm). Particularly, a rapid decrease in surface area (>5 $m^2 \cdot g^{-1}$) and a decrease in pore volume (>0.2 $m^3 \cdot g^{-1}$) demonstrate that the finally obtained porous structure is significantly affected by the drying step FIG. 2B is an image showing the organization structure of the adsorbent according to an embodiment taken by scanning electron microscopy (SEM). Herein, the white bar, green bar and the red bar represent 100 micrometers, 2 micrometers and 2 nanometers, respectively.

Referring to FIG. 2B, it is possible to observe a sponge-like porous channel (green-colored portion) including graphene sheet layers (red-colored portion). In the gelling step of the dispersion of graphene oxide, a macroporous structure is formed by the portions occupied by water trapped between the graphene oxide layers.

FIG. 2B shows an image taken by high-resolution transmission electron microscopy (TEM) and an image (inner side image) illustrating the results of selected area electron diffraction (SAED) showing the discontinuous phase of the adsorbent according to an embodiment.

Figure 2C:
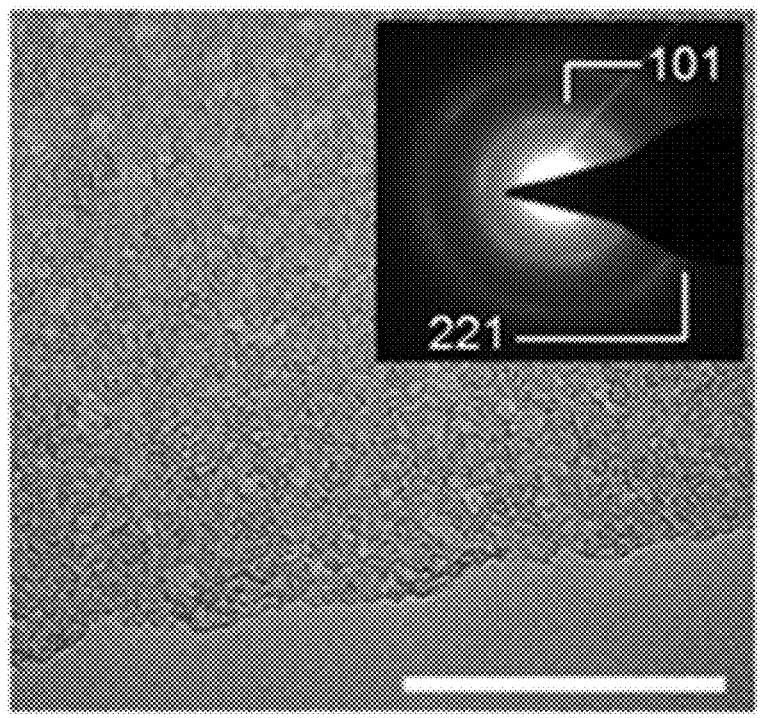
FIG. 2C shows an image taken by transmission electron microscopy (TEM) and an image (inner side image) illustrating the results of selected area electron diffraction (SAED) showing the discontinuous phase of the adsorbent according to an embodiment.

Referring to FIG. 2C, it is possible to visually observe crystalline domains of carbon nitride. After SAED analysis, the discontinuous diffraction pattern (orientation [101] and [221]) is obtained in the adsorbent (g-$C_3N_4$) according to an embodiment of the present disclosure. This demonstrates that carbon nitride is dispersed well in the graphene gel network structure.

Figure 2D:
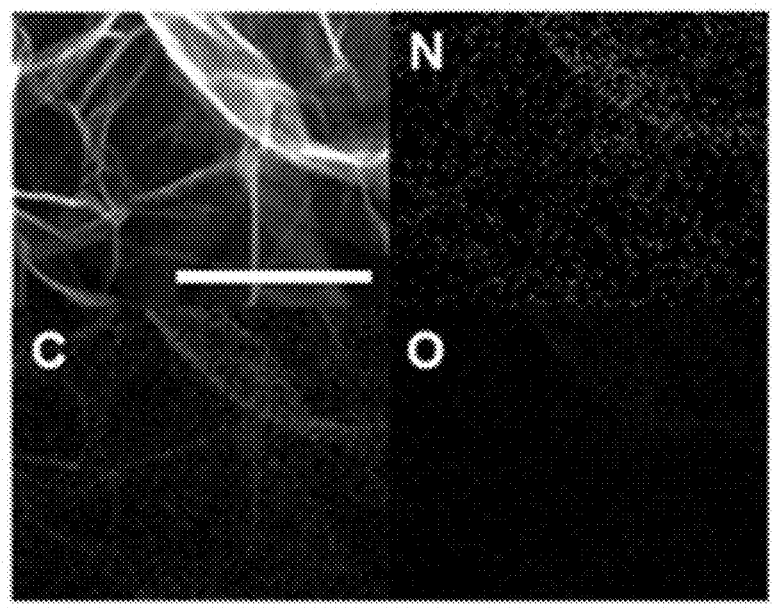
FIG. 2D shows an image taken by scanning transmission electron microscopy (STEM) and the results of electron mapping.

FIG. 2D shows an image taken by scanning transmission electron microscopy (STEM) and the results of electron mapping.

The results of FIG. 2D also illustrate that nitrogen, carbon and oxygen are dispersed well in the graphene gel network structure.

Figure 2E:
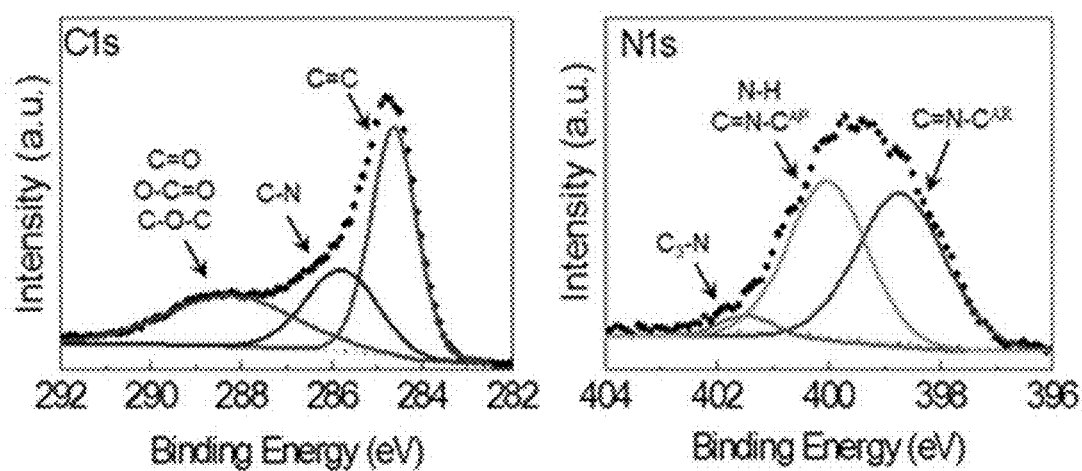
FIG. 2E shows the results of X-ray photoelectron spectroscopy (XPS) of C1s (left side) and of N1s (right side), wherein superscripts AP and AR represent an aliphatic compound and an aromatic compound, respectively.

FIG. 2E shows the results of X-ray photoelectron spectroscopy (XPS) of C1s (left side) and of N1s (right side), wherein superscripts AP and AR represent an aliphatic compound and an aromatic compound, respectively.

It can be seen from the results of FIG. 2E showing graphene domains (284.5 eV) and functional groups bound to graphene oxide (287-291 eV) that the adsorbent according to an embodiment of the present disclosure is essentially based on porous graphene oxide.

Particularly, 285-288 eV, 398-399 eV, 399.5-400.5 eV, and 401-402 eV correspond to C—N, aromatic C=N—C, aliphatic C=N (or N—H), and carbon bound to quaternary amine. All of them are different elements constituting carbon nitride.

After observing the nitrogen functional groups during a thermal annealing step (25-400° C.), it can be seen that a carbon nitride polymer structure is formed by the condensation of dicyandiamide.

As described above, the adsorbent according to an embodiment of the present disclosure includes carbon nitride formed on a reduced graphene oxide network obtained through a gelling step, as a base structure. Particularly, the carbon nitride is polycondensed through a heat treatment step subsequent to the gelling step, and thus has a polymeric structure.

The adsorbent according to an embodiment of the present disclosure has high working capacity, shows excellent adsorption/desorption characteristics even at room temperature under ambient pressure, and has significantly high selectivity to nitrogen gas.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An adsorbent for carbon dioxide comprising:
   a graphene oxide layer having an interconnected network structure; and
   carbon nitride formed on the graphene oxide layer.

2. The adsorbent for carbon dioxide of claim 1, wherein the interconnected network structure is formed by gelling a solution in which the graphene oxide is dispersed.

3. The adsorbent for carbon dioxide of claim 1, wherein the carbon nitride has a graphitic structure.

4. The adsorbent for carbon dioxide of claim 1, the adsorbent for carbon dioxide is obtained by mixing the solution in which graphene oxide is dispersed with a nitrogen-containing carbon material, followed by gelling and heat treatment.

5. The adsorbent for carbon dioxide of claim 3, wherein the carbon nitride is a two-dimensional layered material including hexagonal heptazine(tris-s-triazine) units.

6. The adsorbent for carbon dioxide of claim 1, wherein the carbon nitride has a condensed polymer structure.

7. The adsorbent for carbon dioxide of claim 6, wherein the carbon nitride is bound to the graphene oxide layer in the form of monomers forming the polymer structure, and then condensed to form the polymer structure.

8. An adsorbent for carbon dioxide comprising:

a graphene oxide layer having an interconnected network structure, the interconnected network structure is formed by gelling a solution in which the graphene oxide is dispersed; and carbon nitride formed on the graphene oxide layer, the carbon nitride has a graphitic structure.

9. The adsorbent for carbon dioxide of claim 8, wherein the carbon nitride is a two-dimensional layered material including hexagonal heptazine(tris-s-triazine) units.

10. An adsorbent for carbon dioxide comprising:

a graphene oxide layer having an interconnected network structure, the interconnected network structure is formed by gelling a solution in which the graphene oxide is dispersed; and carbon nitride formed on the graphene oxide layer, the carbon nitride has a condensed polymer structure.

11. The adsorbent for carbon dioxide of claim 10, wherein the carbon nitride is bound to the graphene oxide layer in the form of monomers forming the polymer structure, and then condensed to form the polymer structure.

\* \* \* \* \*